US008228088B1

(12) United States Patent
Hinze et al.

(10) Patent No.: US 8,228,088 B1
(45) Date of Patent: Jul. 24, 2012

(54) AUTOMATED SOLAR MODULE TESTING (76) Inventors: Brett Hinze, San Jose, CA (US); Franz Mairhofer, San Jose, CA (US); George Chatalbashev, San Jose, CA (US); Jason Corneille, San Jose, CA (US); Darin Birtwhistle, San Francisco, CA (US)

( * ) Notice: Subject to any disclaimer, the term of this patent is extended or adjusted under 35 U.S.C. 154(b) by 384 days.

(21) Appl. No.: 12/537,260

(22) Filed: Aug. 7, 2009

(51) Int. Cl.
*G01R 31/26* (2006.01)
(52) U.S. Cl. .................... 324/761.01; 324/762.01
(58) Field of Classification Search ............ 324/761.01, 324/762.01–762.1, 754.01–754.3, 757.01; 257/48; 438/14–18
See application file for complete search history.

(56) References Cited

U.S. PATENT DOCUMENTS

| | | | |
|---|---|---|---|
| 4,460,232 A | 7/1984 | Sotolongo | |
| 4,773,944 A | 9/1988 | Nath | |
| 5,233,067 A * | 8/1993 | Swei et al. | 556/427 |
| 5,993,081 A | 11/1999 | Itoh | |
| 6,054,865 A | 4/2000 | Bald | |
| 6,133,745 A * | 10/2000 | Yoon et al. | 324/750.25 |
| 6,717,519 B2 | 4/2004 | Kobayashi | |
| 6,753,692 B2 | 6/2004 | Toyomura | |
| 6,974,976 B2 | 12/2005 | Hollars | |
| 6,979,771 B2 | 12/2005 | Mimura | |
| 7,042,553 B2 | 5/2006 | An | |
| 2006/0103371 A1 | 5/2006 | Manz | |
| 2006/0180196 A1 | 8/2006 | Lares | |
| 2006/0238750 A1 | 10/2006 | Shimotomai | |
| 2007/0068567 A1 | 3/2007 | Rubin | |
| 2007/0283996 A1 | 12/2007 | Hachtmann | |
| 2008/0053519 A1 | 3/2008 | Pearce | |
| 2008/0099064 A1 | 5/2008 | Hayes | |
| 2009/0014057 A1 | 1/2009 | Croft | |
| 2009/0014058 A1 | 1/2009 | Croft | |
| 2009/0077804 A1 | 3/2009 | Bachrach | |

\* cited by examiner

*Primary Examiner* — Tung X Nguyen
(74) *Attorney, Agent, or Firm* — Chris R. Schmidt

(57) ABSTRACT

Automated testing of solar panel modules employs a gantry system to continuously transfer modules in and out of a workstation where the modules undergo solar simulation current voltage testing and high voltage safety measurements. The gantry system includes a carriage and a clamp device that is adopted to receive and secure the perimeter of each module, which has a positive and negative junction box, located on its back side and contact pins are inserted into the junction boxes during testing. The clamp has an electrically conductive inner perimeter that engages the corresponding outer perimeter of module. High voltage testing determines the level of current leakage between the interior and exterior of the module. A takt time of fifteen seconds or better is achieved.

21 Claims, 5 Drawing Sheets

AUTOMATED SOLAR MODULE TESTING

FIELD OF THE INVENTION

The present invention generally relates to compliance testing of solar modules and particularly to automated solar simulation and high potential measurements of glass-on-glass panel modules containing laminated thin-film photovoltaic or solar cells.

BACKGROUND OF THE INVENTION

Photovoltaic cells are widely used in residential structures and roofing materials for generation of electricity. A plurality of photovoltaic cells are interconnected in series or in parallel and are integrated with residential structures such as roofing slates, roofing tiles, building claddings and the like. Interest in thin-film photovoltaics has expanded in recent years. This is due primarily to improvements in conversion efficiency of cells made at the laboratory scale, and the anticipation that manufacturing costs can be significantly reduced compared to the older and more expensive crystalline and polycrystalline silicon technology. The term "thin-film" typically refers to the thickness of the photovoltaic p-n junction layers and is used to distinguish this type of solar cell from the more common silicon-based cell, which uses a relatively thick silicon wafer. For example, CIGS or CdTe are classes of "thin film" photovoltaic structures (usually less than 10 microns in total thickness). Although these photovoltaic structures can be deposited onto thick, heavy stainless steel or even onto glass, solar cells fabricated in this manner are still considered "thin film" solar cells. In operation, a number of thin-film solar cells are electrically connected to each other and mounted within a support structure such as protective panels to form photovoltaic modules.

Photovoltaic modules must meet numerous quality control standards. Two of the most critical performance and safety compliance protocols are solar simulation, wherein certain electrical measurements, such current-voltage characteristics, of the modules are measured, and high voltage testing wherein the dielectric strength of the insulating materials and the level of leakage current are determined. These tests have been performed manually, which increases both manufacturing time and expense.

SUMMARY OF THE INVENTION

The present invention is based in part on the development of a fully automated production line whereby fragile glass-on-glass solar panel modules undergo solar simulation and high potential testing. The module's ability to convert sunlight into electricity is measured by solar simulation whereby the module is illuminated with a pulse of radiation and the module's performance characteristics such as its maximum power, short circuit current, and open circuit voltage are measured. The module's structural integrity and specifically its electrical insulation resistance are measured by high potential testing whereby a high voltage is applied to the photovoltaic cells of module and potentially dangerous conductive paths are detected.

In one aspect, the invention is directed to an apparatus for testing a solar panel module, which includes a plurality of electrically interconnected photovoltaic cells and at least one junction box, that includes:

a clamp device adopted to receive and secure the solar panel module wherein the clamp has an electrically conductive inner perimeter that engages the corresponding outer perimeter of the solar panel module;

a voltage source that is selectively coupled to the plurality of electrically interconnected photovoltaic cells; and means for measuring an electrical characteristic of the solar panel module when the voltage source is coupled to the plurality of electrically interconnected photovoltaic cells.

In another aspect, the invention is directed to an apparatus for continuous testing of solar panel modules, wherein each solar panel module has a plurality of electrically interconnected photovoltaic cells and at least one junction box, that includes:

a work station having an entry and an exit;

a gantry system that includes a carriage and a clamp device that is adopted to receive and secure a solar panel module wherein the clamp has an electrically conductive inner perimeter that engages the corresponding outer perimeter of the solar panel module, and wherein the carriage transports the solar panel module to the entry, through the workstation, and to the exit; and means for measuring an electrical characteristic of the solar panel module.

In yet another aspect, the invention is directed to an apparatus for continuously testing solar panel modules, wherein each solar panel module has a plurality of electrically interconnected photovoltaic cells and at least one junction, which is mounted on a back side of the solar panel module, which includes:

a workstation having an entry and an exit;

a gantry system that includes a carriage and a clamp device that is adopted to receive and secure a solar panel module wherein the clamp has an electrically conductive inner perimeter that engages the corresponding outer perimeter of the solar panel module, and wherein the carriage transports the solar panel module to the entry, through the work station, and to the exit;

a voltage source that is selectively coupled to the a plurality of electrically interconnected photovoltaic cells;

means for measuring a first electrical characteristic of the solar panel module when the voltage source is coupled to the plurality of electrically interconnected photovoltaic cells;

a radiation source, positioned within the work station, that directs radiation toward a front side of solar panel module; and means for measuring a second electrical characteristic of the solar panel module when the radiation is directed to the front side of the solar panel module.

In a further aspect, the invention is directed to a method of continuously testing solar panel modules, with each solar panel module having a plurality of electrically interconnected photovoltaic cells and at least one junction box mounted on its back side, that includes the steps of providing a workstation that includes an entrance and an exit;

transporting a solar panel module with its back side facing upward into the workstation using a gantry system that includes a carriage and a clamp device that is adopted to receive and secure a solar panel module wherein the clamp has an electrically conductive inner perimeter that engages the corresponding outer perimeter of the solar panel module;

applying a voltage between the plurality of electrically interconnected photovoltaic cells and the electrically conductive inner perimeter;

measuring a first electrical characteristic of the solar panel module when the voltage source is applied;

directing radiation to a front side of solar panel module; and measuring a second electrical characteristic of the solar panel module when the radiation is directed to the front side of the solar panel module.

The inner surfaces of the clamps are preferably lined with an electrically conductive polymeric material that can be clad with metal and/or incorporate metal particles for enhanced electrical contact. A preferred high potential testing protocol comprises applying a high voltage from the module perimeter to both the junction box pins to test for current leakage. Similarly, during solar simulation, a voltage can be applied across the positive and negative junction box pins to ascertain module performance characteristics. Specifically, the voltage is swept through a predetermined voltage range and its current-voltage curved is measured for full solar panel module characterization.

DESCRIPTION OF PREFERRED EMBODIMENTS OF THE INVENTION

The present invention provides techniques for implementing an automated production line performance and safety-testing program for solar panel modules. As used herein, the term "solar panel module" or "module" includes an assembly of a plurality of electrically interconnected photovoltaic or solar cells. The solar cells are encapsulated in a polymeric material that is encased between protective sheets such as glass or plastic. Photovoltaic cells and modules are further described in Hachtmann et al. US Pub. No. 2007/0283996, Pearce et al. US Pub. No. 2008/0053519, Croft et al. US Pub. No. 2009/0014057 and Croft et al. US Pub. No. 2009/0014058, which are incorporated herein by reference. Within the module, each photovoltaic cell has a positive output and a negative output, which in turn, are electrically connected in series-parallel to a common positive and negative bus bar or output wire, respectively, to produce the desired voltage from the module. The terminals of the positive and negative outputs pass through the backing material of the module and are in turn connected to positive and negative output cables. Junction boxes are protective structures that are positioned and secured over the connections between the output wires and cables and module interconnection cable. Each module can have a single junction box housing both output cables or, each module can have dual junction boxes, separately housing the positive and negative output cables.

Figure 1:
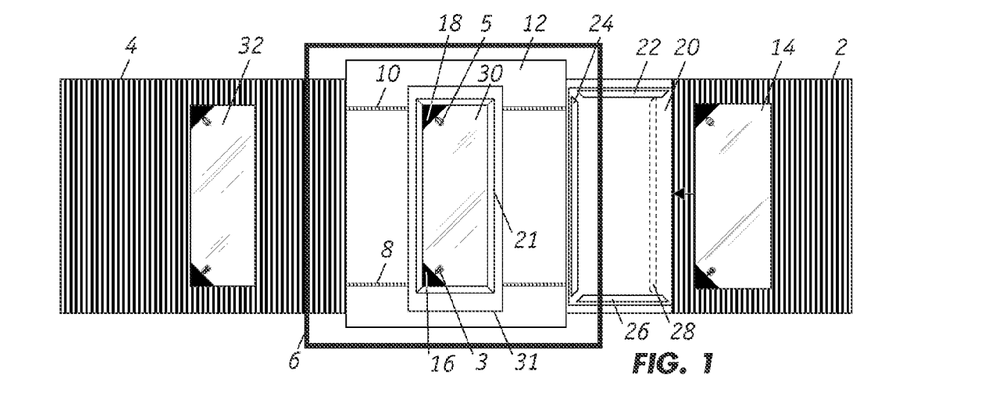
FIG. 1 is a top plan view of an automated in-line solar panel module testing system.

As shown in FIG. 1, the automated, in-line solar panel module testing apparatus of the present invention includes an entry conveyor 2 that delivers solar panel module 14 toward a workstation that is shielded by housing 6 and an exit conveyor 4 that removes module 32, which has been tested. Conveyors 2 and 4 can each comprise motorized rollers. As incoming module 14 approaches the workstation, the outer perimeter of module 14 is be secured by a set of clamps 22, 24, 26 and 28 which are supported on a gantry frame 20 which is part of a gantry system that transfers the clamped module assembly into and through the workstation. As further described herein, the inner perimeters of the clamps, which come into contact with the outer perimeter of module 14, are electrically conductive.

Within the workstation, assembled clamps 21 have been secured around the outer perimeter of module 30 that is supported by a gantry frame 31. Negative contact pin 3 and positive contact pin 5, which can be operatively mounted on gantry frame 31, are inserted into negative terminal and positive terminal junction boxes 16 and 18, respectively. The junction boxes are configured on the back side of module 30 therefore modules are conveyed during the testing process with their relatively smooth front sides facing downward. The transparent front side of each module is the light incident surface. Module 30 moves through the workstation within gantry frame 21 that is transported on a mobile gantry carriage 12 that is seated on parallel rails 8, 10.

Figure 2A:
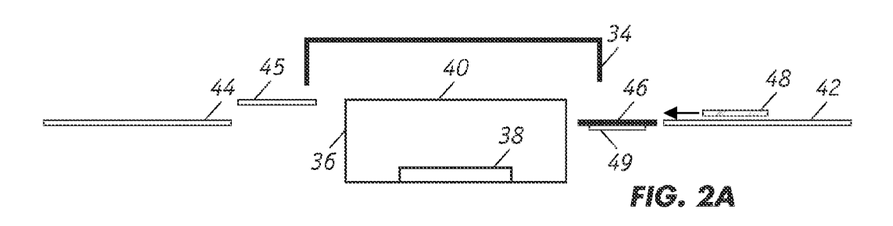
FIGS. 2A, 2B, 2C and 2D are cross sectional schematic views of the testing system.
Figure 2B:
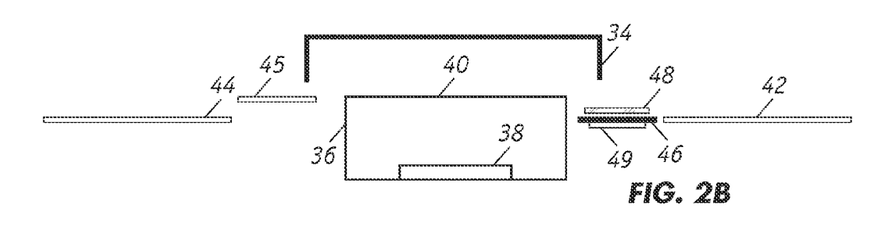
Figure 2C:
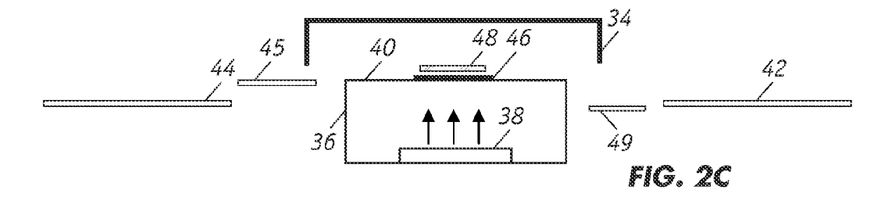

As shown in FIG. 2A, the continuous testing sequence begins as module 48 approaches gantry frame 46 on entry conveyor 42. After being clamped, module 48 is lifted and transferred by gantry frame 46, as shown in FIGS. 2B and 2C, into workstation 36 and onto a gantry carriage (not shown) that travels over rail system 40. Gantry frame 46 is operatively secured to lifter or elevator 49. Rail system 40 is elevated relative to entry conveyor 42. Workstation 36 can incorporate a number of modular testing devices such as a high potential testing apparatus and a solar simulator. The solar simulator includes a source of radiation 38 such as a xenon lamp, which directs light onto the front surface of module 48 during testing and shield 34 protects workers from excessive radiation exposure. In this regard, surfaces of components that are within the vicinity of the solar simulator are preferably made of non-reflective materials. The workstation and peripheral equipment should be suitably electrically insulated as well. To minimize production time, the high potential testing is preferably conducted after solar simulation.

Figure 2D:
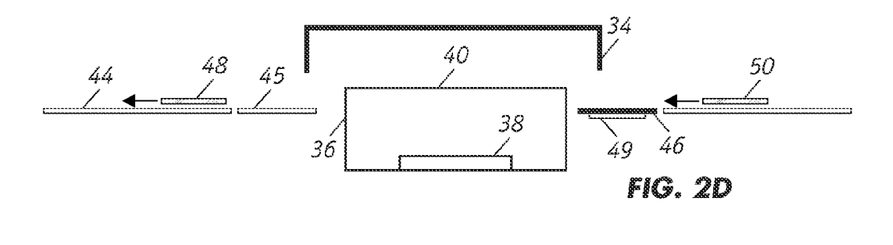

Exit conveyor 44 retrieves module 48 from lifter or elevator 45 following testing as shown in FIG. 2D and, at the same time, gantry frame 46 returns to its original position at the entrance to process the next incoming module. The time for processing one module (commonly referred to as the "takt time") is preferably less than 15 seconds, and more preferably 9 seconds or less. Each tested module is rated and those that meet the applicable standards are ready for installation; the modules can then be labeled and packaged as necessary. A feature of the invention is that the solar module preferably remains horizontal during the entire process, which reduces the likelihood of damage. Another feature is that testing of module 48 can be performed as it is being transported through the workstation. As is apparent, operating different processes in parallel reduces the overall takt time.

Figure 3:
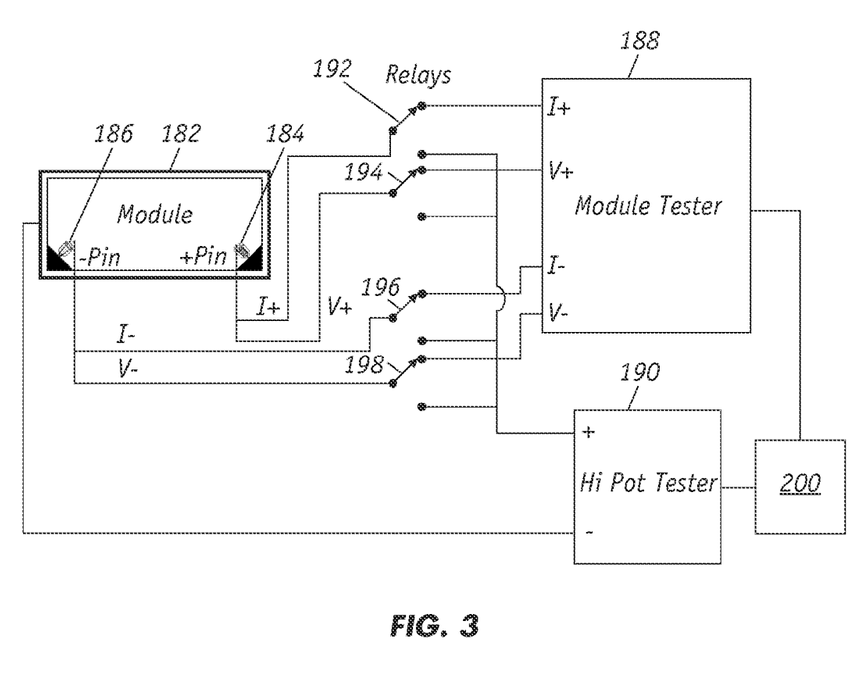
FIG. 3 is the wiring diagram for the solar simulation and high potential testing devices.

Commercially available solar simulators and high voltage testing systems can be modified for implementation with the present invention. A preferred solar simulator is the model 4600 SLP from Spire Corporation (Bedford, Mass.) and a preferred high voltage testing device is the HYPOTULTRA® III model 7650 from Associated Research, Inc. (Lake Forest, Ill.). The wire diagram in FIG. 3 shows that a solar module 182 under test can be connected to either a module tester 188 of the solar simulator or a high voltage tester 190 by a series of relay switches 192, 194, 196 and 198. Module tester 188 has four terminals: two for measuring current and two for measuring voltage and the high voltage tester 190 has positive and negative terminals.

In operation, after module 182 is positioned within workstation 36 (FIG. 2C), positive contact pin 184 is inserted into the positive junction box and negative contact pin 186 is inserted into the negative junction box as shown. The contact pins are each configured as a four-point probe. Concomitantly, the clamps with the electrically conductive inner linings are assembled around module 182. The relays are switched to their first positions as shown so that module 182 is connected to module tester 188. Thereupon, the solar simulation test is initiated as a pulse of radiation is directed from source 38 (FIG. 2c). The test is performed typically using a light intensity of 70-100 mw/cm$^2$ and a flash pulse length of 10-100 ms. The test measures the module's performance characteristics such as, for instance, its maximum power, short circuit current, and open circuit voltage.

Thereafter, relays are then switched to their second positions so that module 182 is connected to high potential tester 190 which applies at least 100 volts, and typically 500 to 5000 volts of DC between the positive and negative terminals of module 182 and thus to photovoltaic cells therein. The voltage and/or current at the inner perimeter of the clamps are measured to determine the level of current leakage for the module. After the high potential test, contact pins 184, 186 are removed from the junction boxes and the clamps with their perimeter contacts are disengaged. Measurement data are analyzed in computer 200, which controls the testing process.

Figure 4A:
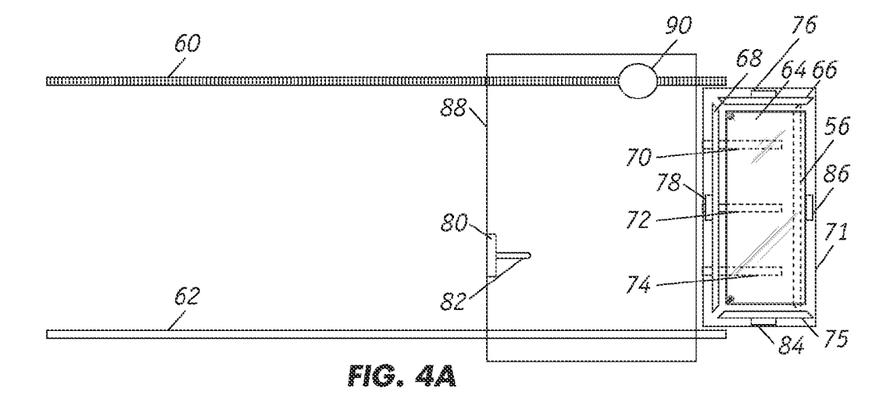
FIGS. 4A, 4B and 4C are top views of the testing system showing a gantry mechanism that transfers the solar panel modules from the conveyor to the workstation.
Figure 4B:
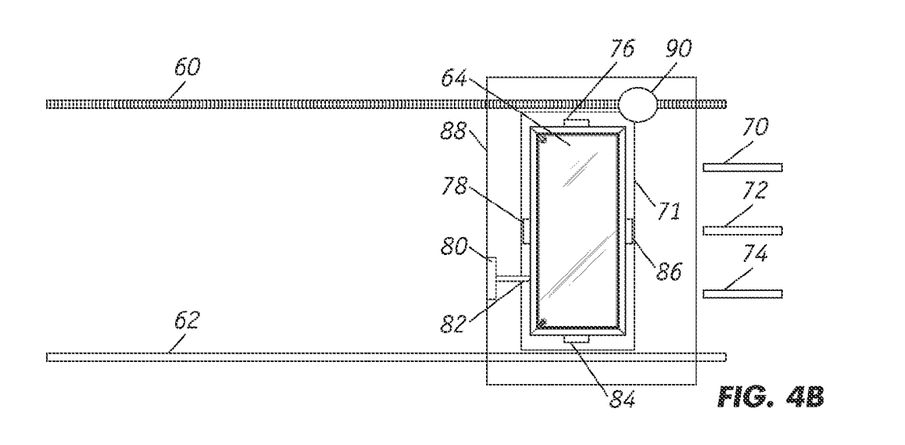

FIGS. 4A and 4B illustrate the gantry mechanism that transfers a module 64 from an entry conveyor (not shown) onto a gantry carriage 88 that is seated on rails 60 and 62. Gantry carriage 88 is equipped with a rack and pinion assembly, including motor 90 and grooves on a rack that is secured to rail 60, to effect linear motion between the entrance and exit of the workstation. Gantry carriage 88 includes roller or slide bearings that engage or ride on rail 62. Clamps 56, 66, 68, and 75, which are operatively secured onto gantry frame 71, are shown in FIG. 4A in the disengaged position oriented to receive incoming module 64. Once module 64 is properly aligned, actuators 76, 78, 84 and 86 are engaged to maneuver the clamps securely around the outer perimeter of module 64. As shown in FIG. 4A, entry conveyor arms 70, 72, and 74 support gantry frame 71; a lifter or elevator (not shown) lifts gantry frame 71 and advances gantry frame 71 onto gantry carriage 88. A voltage meter 80 comes into electrical contact with the assembled clamps via lead 82.

Figure 4C:
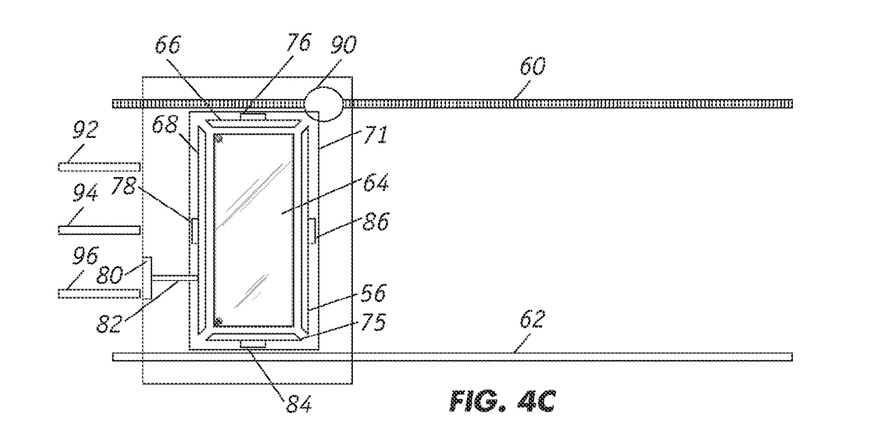

FIG. 4C illustrates a gantry mechanism located at the exit end of the workstation for removing module 64 after it has been tested. Actuators 76, 78, 84, and 86 are disengaged so as to release and shift clamps 56, 66, 68, and 75 away from the perimeter of module 64 that is supported on gantry frame 71. Thereafter, a lifter or elevator (not shown) lowers module 64 to exit conveyor arms 92, 94, and 96 that transfer module 64 onto an exit conveyor (not shown).

Figure 5:
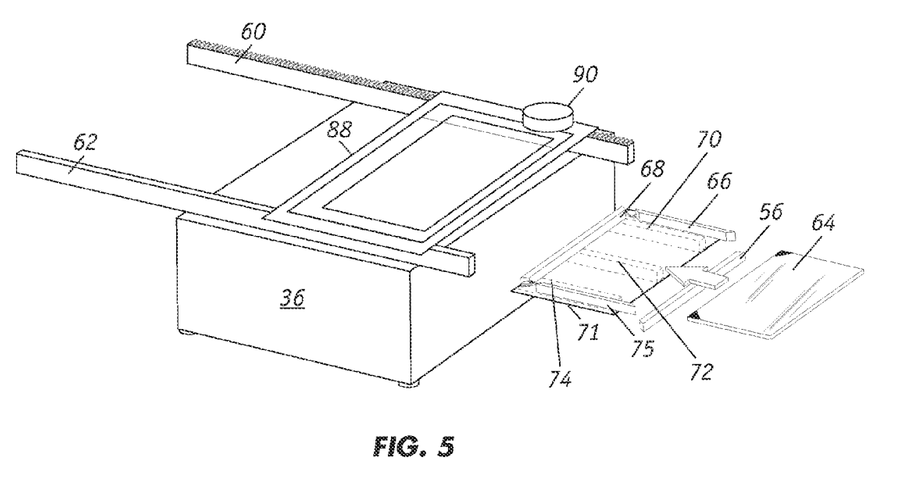
FIG. 5 is a perspective view of the testing system with the gantry mechanism at the entrance to the workstation.

FIG. 5 depicts the positions of disengaged clamps 56, 66, 68 and 75, which are operatively secured to gantry frame 71, as they are about to receive module 64 at the entrance of workstation 36. Clamps 66, 68, and 75 are coplanar whereas clamp 56 is in a lower position to allow module 64 clear access to the coplanar clamps. Once the clamps are assembled around the perimeter of the modular as shown in FIG. 6, entry conveyor arms 70, 72, and 74 lift and maneuver modular 64 onto gantry carrier 88, which is seated on rails 60 and 62 and driven by motor 90.

Figure 6A:
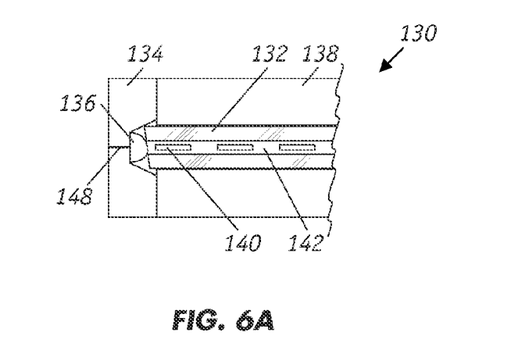
FIG. 6A is a partial cross sectional view of the solar panel module secured by the clamps.

FIG. 6A depicts a clamp-module assembly 130 with module 132 having clamps 134, 138 secured around its outer perimeter. The inner surface of each clamp preferably defines a cavity into which a strip of electrically conductive material 136 inserted. The cavity has beveled sides that facilitate placement of the outer perimeter of module 132 therein. Module 132 includes a plurality of photovoltaic cells 140 that are encapsulated within a polymeric encapsulant material 142 such as ethylene vinyl acetate (EVA). The outer perimeter of the encapsulant material in turn is surrounded with solar edge tape.

While module 132 as illustrated is fabricated with dual protective glass panels, the techniques of the present invention are applicable to continuously testing of other module designs as well. The electrically conductive material 136, which comes into contact with the outer edge of solar panel module 132, is connected to conductor 148 which permits a meter 80 (FIG. 3A) to measure the potential or current at the electrically conductive material 136 during high voltage testing. Conductive materials are preferably non-abrasive, lightweight, and flexible. A suitable conductive material is configured as a gasket having a conductive exterior fabric that encases urethane foam. The fabric comprises a polyester sheet that is plated with silver, copper, nickel or an alloy thereof. Another suitable conductive material is silicone elastomer filled with conductive particles such as silver, copper, aluminum, or nickel. The elastomer can also be plated with a conductor to improve its electrical contact. Both types of conduct materials are available from SEM, Inc. (Rochester, N.Y.).

Figure 7A:
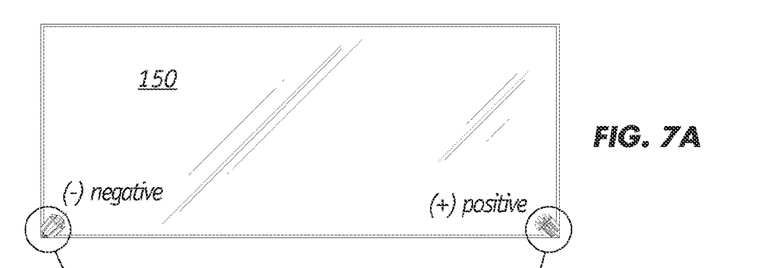
FIGS. 7A, 7B, 7C and 7D depict the solar panel module with dual junction boxes.
Figure 7B:
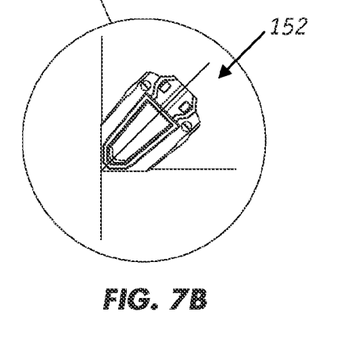
Figure 7C:
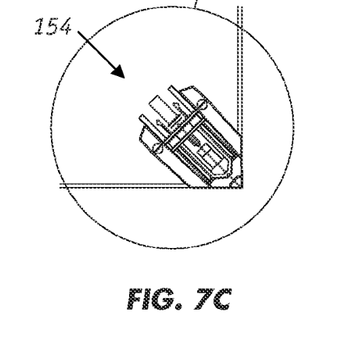
Figure 7D:
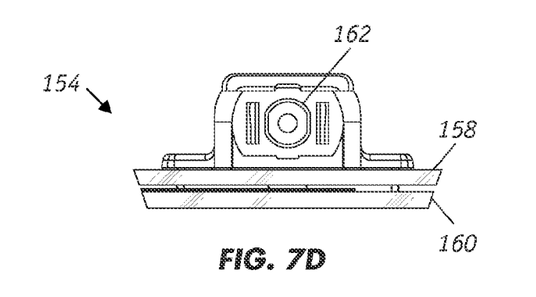

FIGS. 7A, 7B and 7C show the back side of module 150 having dual junction boxes 152, 154 that house the negative and positive terminals, respectively. It is understood that the invention is applicable testing modules regardless of the number of junction boxes. As illustrated in FIG. 7D juncture box 154 houses positive terminal 162 and includes a back side glass panel 158 and a front side glass panel 160. The length and width of panel 160 is slightly smaller that those of panel 160, so the perimeter of the module has a smooth, slanted contour. In one embodiment, the module has a front glass panel that is 1611 mm×665 mm and a back glass panel that is 1610 mm×664 mm. In addition, the solar cells are arranged within the module so as to leave a 12 mm edge along the entire perimeter of the module where no solar cells are positioned.

Figure 6B:
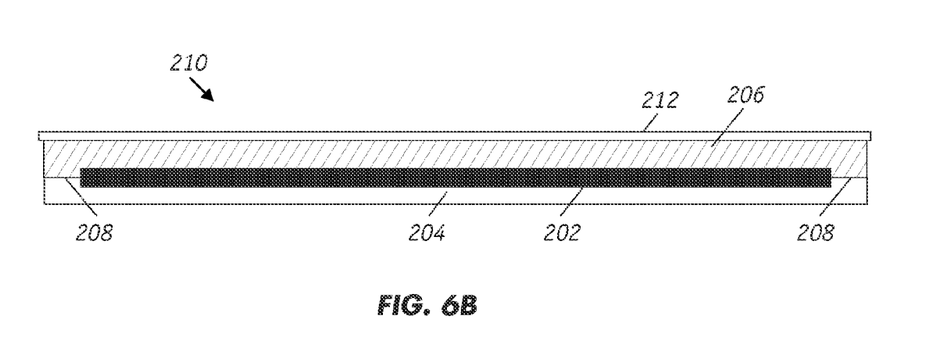
FIG. 6B is a cross sectional view of a flexible back sheet.

Instead of employing glass panel for the back side, modules can be fabricated with a multi-layer flexible back sheet that can be ungrounded since the back sheet preferably does not have exposed moisture barriers or in certain embodiments, any exposed metal parts. When module 132 employs a flexible multi-layer back sheet, the clamp-module assembly 130 as shown in FIG. 6A is configured so that the strip of electrically conductive material 136 is in contact with the entire perimeter of the back sheet. As depicted in FIG. 6B, flexible back sheet 210 comprises, for example, an insulation sheet 204, an electrically isolated moisture barrier 202, a back layer 206 and a seal 208. The insulation sheet 204 is disposed between a plurality of photovoltaic cells (not shown) and the moisture barrier 202 and the moisture barrier 202 is disposed between the insulation sheet 204 and the back layer 206.

In order to test the integrity of the flexible back sheet 210 in the high potential testing, a layer 212 of electrically conductive material is placed over the entire exposed upper surface of back layer 206 as shown in FIG. 6B. Layer 212, which extends over the perimeter of back layer 206, is preferably made of the same material that forms strip 136 (FIG. 6A) located along the cavity of the inner surface of each clamp 134, 138. Thus, as the clamps engage module 132, strip 136 comes into electrical contact with layer 212. Layer 212 can be placed onto back layer 206 along the automated in-line solar panel module testing system anytime prior to engagement of the clamps. Layer 212 is removed after the high potential testing.

Moisture barrier 202 may be any suitable material that is flexible and moisture impermeable that may be defined by the water vapor transmission rate (WVTR), which is the steady state rate at which water vapor permeates through a film at a specified temperature and relative humidity. Preferred moisture barriers have a WVTR of no more than $10^{-2}$ g/m$^2$/day at 38° C. and 100% relative humidity. For example, the moisture barrier can comprise pinhole-free metallic material such as aluminum foil. Insulation sheet 204 is preferably sufficient to withstand a high electrical potential between a conductive moisture barrier 202 and the solar cells (not shown) to prevent arching or sorting. The voltage withstand of the sheet is a function of the physical properties of the insulation sheet material as well as its thickness which is typically from 1 to 10 mils or higher. The voltage withstand is preferably at least about 500 V to 5000 V. Thermoplastic materials can be used including thermal polymer olefins and non-olefin thermoplastic polymers.

Back layer 206 may be a weatherable material that protects the solar cells and other module components from moisture, UV, extreme temperatures and other environmental hazards. For example, fluoropolymers, silicone polyester, and chlorine-containing materials such as PVC can be employed. Finally, seal 208 includes a bond between back layer 206 and insulation sheet 204 and is effective to prevent any electrical contact between the moisture barrier and the solar cells or any other component of the module at the edge of moisture barrier 202. It is typically a permanent or irreversible seal and prevents peeling at the edges that would expose the edge of moisture barrier 202. The seal is preferably at least 0.5 mm wide and extends around the edge of the moisture barrier. The bond between the back layer 206 and insulation layer 204 may be an adhesive bonding, a fusion bonding, a welding, a solder bond, or a mechanical bond. If an adhesive material is used, it may be a thermoplastic adhesive, a liquid adhesive, a curable adhesive, or any other type of adhesive that creates an irreversible seal, is resistant to peeling and has good moisture resistance.

Figure 8:
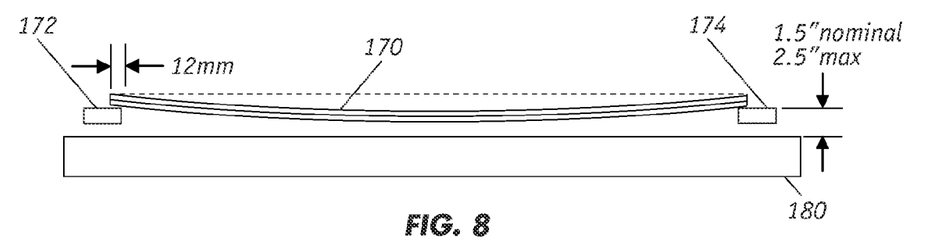
FIG. 8 is a cross sectional view depicting the clamped solar panel module.

FIG. 8 shows the curvature of module 170, having the above dimensions, when it is supported on the right and left sides along its width as module 170 is transported on the edges of gantry frame 172, 174 over a solar simulator testing device 180. In this configuration, radiation from solar simulator 180 is unobstructed as it is directed to the front side of the module. In particular, the solar cells within module 180 have a full view of solar simulator so that there is no shadowing when light flashes occur. Given that each edge of module 170 is placed only 12 mm deep into the gantry frame, the height from the solar simulator 180 to the gantry frame should have a nominal distance of 1.5 in. (3.8 cm). To ensure that the optimized intensity of light is applied to module 170, the height is preferably less than 2.5 in. (6.4 cm).

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. An apparatus for continuous testing of solar panel modules, wherein each solar panel module has a plurality of electrically interconnected photovoltaic cells and at least one junction box, that comprises:
   a workstation having an entry and an exit;
   a gantry system that includes a carriage and a clamp device that is adopted to receive and secure a solar panel module wherein the clamp has an electrically conductive inner perimeter that engages the corresponding outer perimeter of the solar panel module, and wherein the carriage transports the solar panel module to the entry, through the work station, and to the exit;
   means for measuring an electrical characteristic of the solar panel module;
   a voltage source that is selectively coupled to the plurality of electrically interconnected photovoltaic cells; and
   means for measuring a first electrical characteristic of the solar panel module when the voltage source is coupled to the plurality of electrically interconnected photovoltaic cells.

2. The apparatus of claim 1 wherein the means for measuring the first electrical characteristic measures the voltage or current at the electrically conductive inner perimeter.

3. The apparatus of claim 1 wherein the electrically conductive inner perimeter is lined with polymeric material.

4. The apparatus of claim 3 wherein the polymeric material is clad with a metal or incorporates metal particles.

5. The apparatus of claim 1 the voltage source applies a voltage of at least 100 volts.

6. The apparatus of claim 1 further comprising:
   a radiation source, positioned within the work station, that directs radiation toward a front side of solar panel module; and
   means for measuring a second electrical characteristic of the solar panel module when the radiation is directed to the front side of the solar panel module.

7. The apparatus of claim 1 wherein each solar panel module has dual junction boxes mounted thereon.

8. The apparatus of claim 1 wherein each solar panel module comprises a transparent front side, a multi-layer flexible back side; and a plurality of interconnected photovoltaic cells disposed between the transparent front layer and the multi-layer flexible back side and wherein the electrically conductive inner perimeter that engages the multi-layer flexible back side.

9. An apparatus for continuously testing solar panel modules, wherein each solar panel module has a plurality of electrically interconnected photovoltaic cells and at least one junction, which is mounted on a back side of the solar panel module, which comprises:
   a workstation having an entry and an exit;
   a gantry system that includes a carriage and a clamp device that is adopted to receive and secure a solar panel module wherein the clamp has an electrically conductive inner perimeter that engages the corresponding outer perimeter of the solar panel module, and wherein the carriage transports the solar panel module to the entry, through the work station, and to the exit;
   a voltage source that is selectively coupled to the a plurality of electrically interconnected photovoltaic cells;
   means for measuring a first electrical characteristic of the solar panel module when the voltage source is coupled to the plurality of electrically interconnected photovoltaic cells;

a radiation source, positioned within the work station, that directs radiation toward a front side of solar panel module; and means for measuring a second electrical characteristic of the solar panel module when the radiation is directed to the front side of the solar panel module.

10. The apparatus of claim 9 wherein the means for measuring the first electrical characteristic measures the voltage or current at the electrically conductive inner perimeter.

11. The apparatus of claim 10 wherein the means for measuring the second electrical characteristic measures one or more performance characteristics of the solar panel module.

12. The apparatus of claim 9 comprising:
a first conveyor, which is coupled to the gantry system, that supplies individual solar panel modules for testing;
a second conveyor, which is coupled to the exit of the workstation, that receives individual solar panel modules that have been tested.

13. The apparatus of claim 9 wherein the electrically conductive inner perimeter is lined with polymeric material.

14. The apparatus of claim 13 wherein the polymeric material is clad with a metal or incorporates metal particles.

15. The apparatus of claim 9 wherein the voltage source applies a voltage of at least 100 volts.

16. The apparatus of claim 9 wherein each solar panel module comprises a transparent front side, a multi-layer flexible back side; and a plurality of interconnected photovoltaic cells disposed between the transparent front layer and the multi-layer flexible back side and wherein the electrically conductive inner perimeter that engages the multi-layer flexible back side.

17. A method of continuously testing solar panel modules, with each solar panel module having a plurality of electrically interconnected photovoltaic cells and at least one junction box mounted on its backside, that comprises the steps of:

providing a workstation that includes an entrance and an exit;
transporting a solar panel module with its back side facing upward into the workstation using a gantry system that includes a carriage and a clamp device that is adopted to receive and secure a solar panel module wherein the clamp has an electrically conductive inner perimeter that engages the corresponding outer perimeter of the solar panel module;
applying a voltage to the a plurality of electrically interconnected photovoltaic cells;
measuring a first electrical characteristic of the solar panel module when the voltage source is coupled to the plurality of electrically interconnected photovoltaic cells;
directing radiation a front side of solar panel module; and
measuring a second electrical characteristic of the solar panel module when the radiation is directed to the front side of the solar panel module.

18. The method of claim 17 wherein the step of measuring the first electrical characteristic measures the voltage or current at the electrically conductive inner perimeter.

19. The method of claim 18 wherein the step of measuring the second electrical characteristic measures one or more performance characteristics of the solar panel module.

20. The method of claim 17 wherein the testing of solar panel modules is performed as the solar panel module is transported through the workstation.

21. The method of claim 17 wherein each solar panel module comprises a transparent front side, a multi-layer flexible back side; and a plurality of interconnected photovoltaic cells disposed between the transparent front layer and the multi-layer flexible back side and wherein the electrically conductive inner perimeter that engages the multi-layer flexible back side.

* * * * *